(12) United States Patent
Huang et al.

(10) Patent No.: US 11,760,834 B2
(45) Date of Patent: Sep. 19, 2023

(54) POLYESTER AND MOLDED ARTICLE

(71) Applicant: Chang Chun Plastics Co., Ltd., Taipei (TW)

(72) Inventors: Ching-Jui Huang, Taipei (TW); Ping-Chieh Wang, Taipei (TW)

(73) Assignee: Chang Chun Plastics Co., Ltd., Taipei (TW)

( * ) Notice: Subject to any disclaimer, the term of this patent is extended or adjusted under 35 U.S.C. 154(b) by 0 days.

(21) Appl. No.: 17/956,885

(22) Filed: Sep. 30, 2022

(65) Prior Publication Data

US 2023/0095889 A1  Mar. 30, 2023

(30) Foreign Application Priority Data

Sep. 30, 2021  (TW) .................................. 110136497

(51) Int. Cl.
| | | |
|---|---|---|
| *C08G 63/199* | (2006.01) | |
| *C08G 63/85* | (2006.01) | |
| *C08G 63/183* | (2006.01) | |

(52) U.S. Cl.
CPC ......... *C08G 63/199* (2013.01); *C08G 63/183* (2013.01); *C08G 63/85* (2013.01)

(58) Field of Classification Search
None
See application file for complete search history.

(56) References Cited

U.S. PATENT DOCUMENTS

| | | | |
|---|---|---|---|
| 5,681,918 A | 10/1997 | Adams et al. | |
| 2019/0077908 A1* | 3/2019 | Sim | C09D 167/025 |
| 2020/0369826 A1* | 11/2020 | Kim | C08K 5/29 |
| 2021/0040261 A1* | 2/2021 | Kim | C08G 63/183 |

FOREIGN PATENT DOCUMENTS

| | | | |
|---|---|---|---|
| CN | 112574400 A | 3/2021 | |
| KR | 20140009210 A | 1/2014 | |
| TW | 201938632 A | 10/2019 | |
| WO | WO-2019156429 A1 * | 8/2019 | ............. C08G 63/12 |
| WO | WO-2021262953 A1 * | 12/2021 | ........... C08G 63/199 |

* cited by examiner

*Primary Examiner* — Robert S Loewe

(74) *Attorney, Agent, or Firm* — Joseph C. Zucchero; Carolyn S. Elmore; Elmore Patent Law Group, P.C.

(57) ABSTRACT

Disclosed is a polyester and molded article. The polyester includes residues of formula (i), formula (ii), and formula (iii):

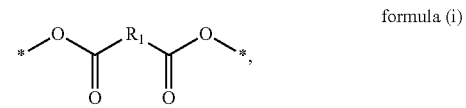

formula (i)

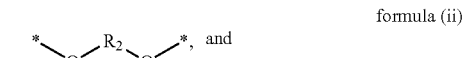

formula (ii)

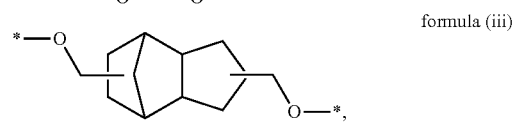

formula (iii)

in which $R_1$ is an arylene group; $R_2$ is a $C_2$-$C_6$ straight-chain hydrocarbylene group; and * represents a linking bond. The polyester has a number average molecular weight not less than 15,000 and has a degree of dispersion ranged from 2.95 to 5.70.

20 Claims, No Drawings

POLYESTER AND MOLDED ARTICLE

CROSS-REFERENCE TO RELATED APPLICATION

This application claims priority to Taiwan Application Serial Number 110136497, filed Sep. 30, 2021, which is herein incorporated by reference in its entirety.

BACKGROUND

Field of Invention

The present disclosure relates to a polyester and a molded article.

Description of Related Art

Tricyclodecanedimethanol (TCDDM) monomer can be used in polyester to improve the mechanical strength and heat resistance of polyester. However, because the molecular weight and the boiling point of the TCDDM monomer are high, and the TCDDM has poor reactivity compared with other monomers in reaction, the mechanical properties of the resulting polyester are poor. For example, the resulting polyester has a lower ensile strength.

Therefore, in response to the need described above, a polyester including TCDDM is desired, and its tensile strength must meet the requirement of industry.

SUMMARY

The present disclosure provides a polyester including residues of formula (i), (ii) and formula (iii):

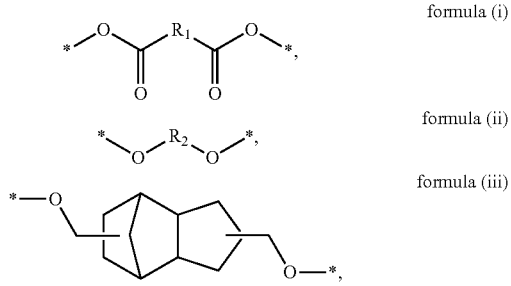

formula (i)

formula (ii)

formula (iii)

in which $R_1$ is an arylene group; $R_2$ is a $C_2$-$C_6$ straight-chain hydrocarbylene group; * represents a linking bond. The polyester has a number average molecular weight not less than 15,000 and has a degree of dispersion ranged from 2.95 to 5.70. The degree of dispersion is defined herein as the ratio of weight average molecular weight (Mw) to number average molecular weight (Mn), i.e., Mw/Mn.

In one or more embodiments of the present disclosure, $R_1$ is

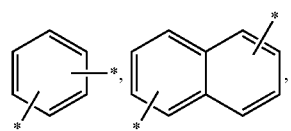

or a combination thereof.

In one or more embodiments of the present disclosure, $R_2$ is a $C_2$-$C_4$ straight-chain hydrocarbylene group.

In one or more embodiments of the present disclosure, $R_2$ is a $C_2$ straight-chain hydrocarbylene group.

In one or more embodiments of the present disclosure, the number average molecular weight is 15,000 to 25,000.

In one or more embodiments of the present disclosure, the number average molecular weight is 16,000 to 23,000.

In one or more embodiments of the present disclosure, the degree of dispersion is 3.00 to 4.50.

In one or more embodiments of the present disclosure, the degree of dispersion is 3.10 to 4.50.

In one or more embodiments of the present disclosure, the degree of dispersion is 3.13 to 4.50.

In one or more embodiments of the present disclosure, the residue of formula (iii) is 10% to 90% of a sum of the residue of formula (ii) and the residue of formula (iii).

In one or more embodiments of the present disclosure, the residue of formula (ill) is 20% to 80% of a sum of the residue of formula (ii) and the residue of formula (iii).

The present disclosure also provides a molded article including the polyester in any one of embodiments described above.

DETAILED DESCRIPTION

To make the description of the present disclosure more detailed and complete, the following is an illustrative description of the embodiment of the present disclosure and specific examples; however, it is not the only form of implementing or using specific embodiments of the present disclosure. The embodiments disclosed below may be combined or substituted in favorable circumstances, and other embodiments may also append to one embodiment without further documentation or explanation. In the following description, many specific details will be described in detail to make the reader fully understand the following embodiments. However, embodiments of the present disclosure may practice without such specific details.

Although the following series of operations or steps are applied to illustrate the methods of the present disclosure, the order in which these operations or steps are shown should not be explained as limiting the present disclosure. For example, certain operations or steps may perform in different orders and/or perform simultaneously. Further, not all the operations, steps, and/or features illustrated should be performed to achieve the embodiment of the present disclosure. Besides, each operation or step described herein may contain several sub-steps or sub-operations.

The present disclosure provides a polyester. The polyester includes residues of formula (i), (ii), and (iii):

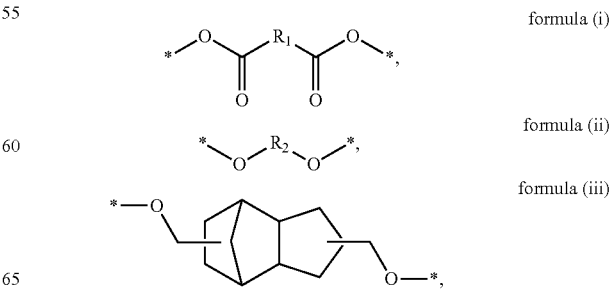

formula (i)

formula (ii)

formula (iii)

in which $R_1$ is an arylene group, $R_2$ is a $C_2$-$C_6$ straight-chain hydrocarbylene group, and * represents a linking bond.

The residue of formula (i) is derived from a diprotic acid monomer. In some embodiments, the diprotic acid monomer includes an aromatic dicarboxylic acid. In some embodiments, $R_1$ of formula (i) is a $C_6$-$C_{16}$ arylene group. In some embodiments, $R_1$ of formula (i) is

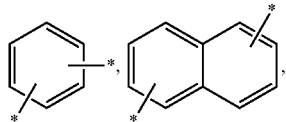

or a combination thereof, where * represents a linking bond. In some embodiments, the diprotic acid monomer may be, for example, terephthalic acid (PTA) or 1,4-naphthalenedicarboxylic acid (NDA). In some embodiments, the mole number of formula (i) accounts for 50 mol % of the sum of the mole numbers of formulas (i) to formula (iii).

The residue of formula (i) is derived from a diprotic acid monomer, in some embodiments, the diprotic acid monomer includes an aromatic dicarboxylic acid. In some embodiments, $R_1$ of formula (i) is a $C_6$-$C_{16}$ aromatic group. In some embodiments, $R_1$ of formula (i) is

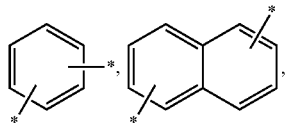

or a combination thereof, where * represents a linking bond. In some embodiments, the diprotic acid monomer may be, for example, terephthalic acid (PTA) or 1,4-naphthalenedicarboxylic acid (NDA). In some embodiments, the mole number of formula (i) accounts for 50 mol % of the sum of the mole numbers of formulas (i) to formula (iii).

The residue of formula (ii) is derived from an aliphatic straight-chain diol monomer. In some embodiments of the present disclosure, $R_2$ in formula (ii) is a $C_2$-$C_4$ straight-chain hydrocarbylene group. In some embodiments of the present disclosure, $R_2$ is a $C_2$ straight-chain hydrocarbylene group.

In some embodiments, the residue of formula (iii) is derived from tricyclodecane dimethanol (TCDDM). In one or more embodiments of the present disclosure, the residue of formula (iii) accounts for 10% to 90% of the sum of the residue of formula (ii) and the residue of formula (and preferably be 20% to 80%, e.g., 30%, 40%, 50%, 60%, or 70%. It is worth noting that if the residue of formula (iii) accounts for 10% to 90% of the sum of the residue of formula (ii) and the residue of formula (iii), the polyester of the present disclosure can have high mechanical strength and heat resistance.

In some embodiments, polyester further includes a residue of the following formula (iv):

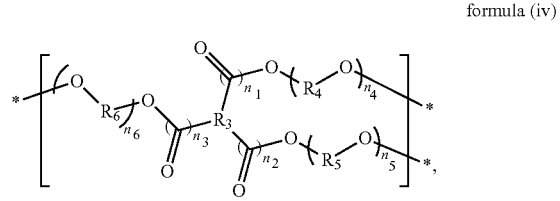

formula (iv)

where $R_3$ is a $C_3$-$C_{20}$ hydrocarbon group, $R_4$, $R_5$, and $R_6$ is a $C_1$-$C_6$ hydrocarbon group, $n_1$, $n_2$, $n_3$, $n_4$, $n_5$, and $n_6$ is 0 or 1. In some embodiments, $R_3$ is a $C_3$-$C_{20}$ aliphatic hydrocarbon group or a $C_4$-$C_{20}$ aromatic hydrocarbon group.

In some embodiments, the residue of formula (iv) is selected from the following group consisting of

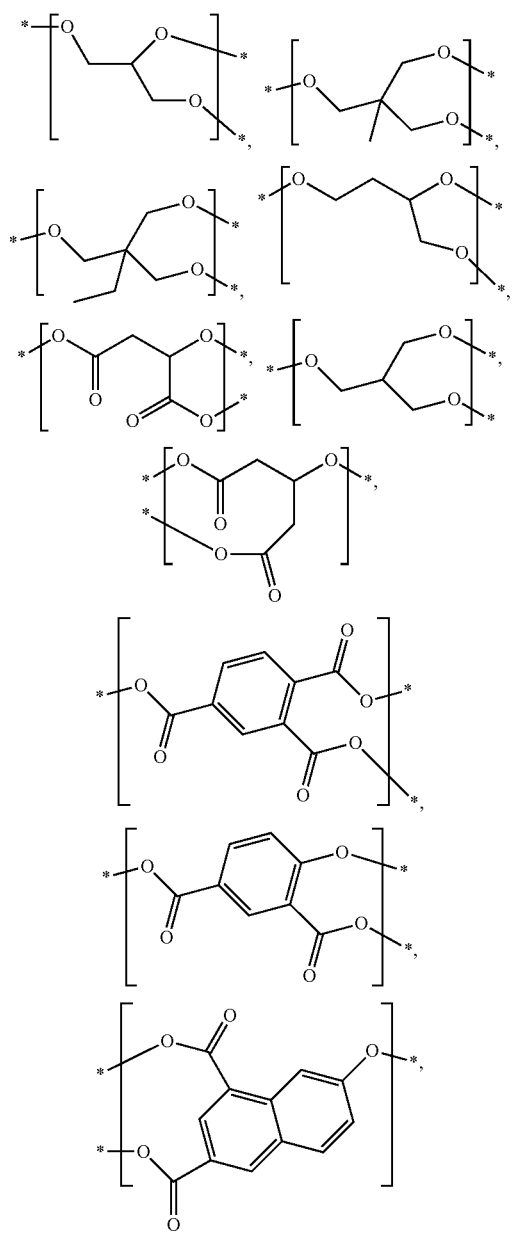

-continued

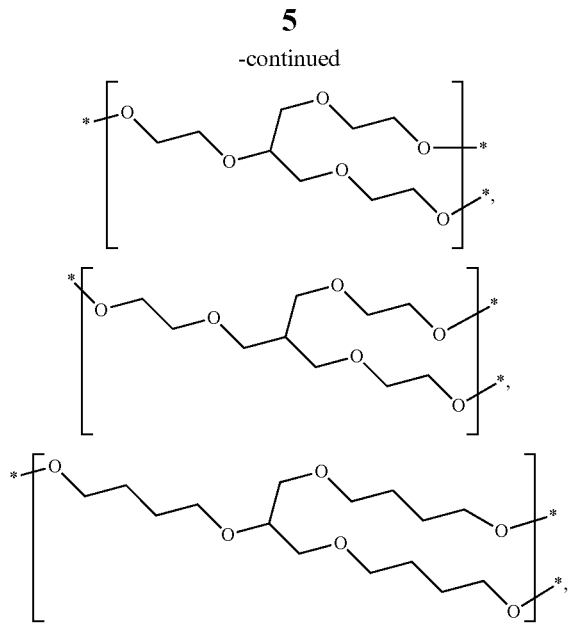

and combinations thereof, where * represents a linking bond.

In some embodiments, the residue of formula (iv) is derived from the following group consisting of

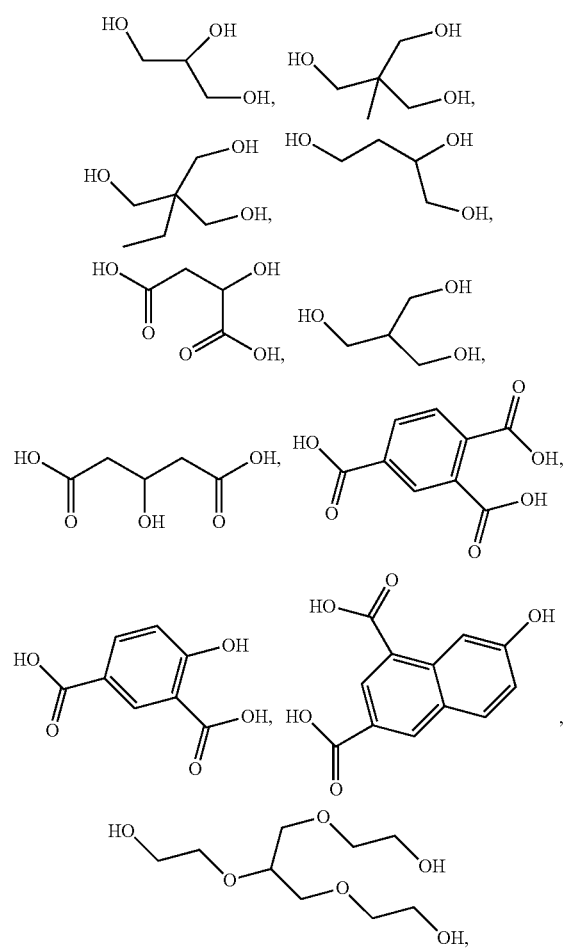

-continued and combinations thereof, in which * represents a linking bond. In some embodiments, the residue of formula (iv) accounts for 0.1 mol % to 0.55 mol % of the polyester, e.g., 0.2 mol %, 0.3 mol %, or 0.4 mol %.

In one or more embodiments of the present disclosure, the number average molecular weight of the polyester is not less than 15,000, preferably 15,000 to 25,000, and more preferably 16,000 to 23,000, e.g., 17,000, 18,000, 19,000, 20,000, 21,000, and 22,000. In one or more embodiments of the present disclosure, the polyester has a degree of dispersion from 2.95 to 5.70, preferably 3.10 to 4.50, and more preferably 3.13 to 4.50, e.g., 3.25, 3.50, 3.75, 4.0, or 4.25. It is worth noting that by controlling the number average molecular weight and the degree of dispersion of the polyester in the above range, the mechanical properties of the polyester of the present disclosure can significantly improve. For example, the polyester has good tensile strength. In some embodiments, the polyester of the present disclosure has a tensile strength greater than 130% and an inherent viscosity greater than 0.5 Dl/g to 0.8 Dl/g. In the measurement of the inherent viscosity, 250 mg of polyester was dissolved in 50 ml of solvent and measured at 25° C., where the solvent was composed of phenol and dichlorobenzene with a weight ratio of 60:40.

The present disclosure also provides a molded article. The molded article includes the polyester described above. According to various embodiments, the polyester of the present disclosure may be used in, for example, but not limited to food contact, automotive molds, commercial housewares, compounders consumers, electronics, device housings, in-store fixtures, electronic packaging, outdoor signs, personal care, cosmetics packaging, sporting equipment tools, toys, and water/sports bottles.

The polyester of the present disclosure may be prepared by one or more methods, for example, mixing the reaction monomers such as diprotic acid, tricyclodecane dimethanol, and other dials with the control of the dial versus diprotic acid molar ratio being 1.8 to 4.0 in the esterification reaction. In another embodiment of the present disclosure, it may also be possible to add an extra 0.2 to 0.8 mol % glycerol or TMP, or 1.5 mol % HDI while controlling the did versus diprotic acid molar ratio being 1.5 to 4.0 in the esterification reaction. The various preparation methods provided above do not mean that the polyester of the present disclosure can be prepared only by these methods.

In some embodiments of the present disclosure, the polyester may be prepared by the following steps, including step (a) mixing the reaction monomers to form a mixture, step (b) esterifying the reaction monomers to form oligomers, and step (c) further polymerizing the oligomers to form a polymer.

The reaction monomers of step (a) include diprotic acid, aliphatic straight-chain did monomer, and tricyclodecane dimethanol. Diprotic adds may be aromatic dicarboxylic acids, such as terephthalic add or 1,4-naphthalenedicarboxylic acid. Aliphatic straight-chain did monomers may be, for example, ethylene glycol, 1,3-propanediol, or 1,4-butanediol. In some embodiments, the reaction monomers of step (a) optionally include a compound having a structure of the above formula (iv), such as glycerol, trimethylolpropane (IMP), or trimellitic add (TMA).

In step (a), the reaction monomers are added to an autoclave. The high-pressure autoclave may be, for example, but not limited to a vertical autoclave, a horizontal autoclave, a batch autoclave, or a continuous cascading autoclave. In some embodiments, the reaction monomers are uniformly stirred with the stirring rate between 100 rpm to 500 rpm.

In some embodiments, a catalyst may be added in step (a) to facilitate the reaction. In other embodiments, a catalyst may be added in step (b). The catalysts may be, for example, but not limited to titanium(IV) butoxide, $Sb_2O_3$, $Sb(QAc)_3$, $GeO_2$, titanium(IV) isopropoxide, butyltin tris(2-ethylhexanoate), or combinations thereof. In one of the embodiments of the present disclosure, titanium(IV) butoxide is used as the catalyst.

In some embodiments, a co-catalyst and/or a heat stabilizer may be added to step (a). In other embodiments, a co-catalyst and/or a heat stabilizer may be added to step (b). The co-catalyst ray be, for example, but not limited to copper acetate, zinc acetate, catalyst magnesium, sodium acetate, potassium acetate. In one embodiment of the present disclosure, no co-catalyst is added. The heat stabilizers may be, for example, but not limited to triphenyl phosphite, phosphoric acid, phosphorous acid, hypophosphorous acid and its salts, trimethyl phosphate (TMP), triethyl phosphate (TEP), tripropyl phosphate (TPP),
3,9-bis(octadecyloxy)-2,4,8,10-tetraoxa-3,9-diphosphaspiro [5.5]undecane,
bis(2,6-di-tert-butyl-4-methylphenyl)pentaerythrital-diphosphite,
tris(2,4-di-tert-butylphenyl) phosphite, and
tetrakis(2,4-di-tert-butylphenyl)4,4'-biphenyl. In one of the embodiments of the present disclosure, TMP is used as the heat stabilizer.

The next is step (b). The reaction monomers are esterified to form oligomers. Step (b) includes heating the mixture from step (a) so that the reaction monomers undergo an esterification reaction to form oligomers. In some embodiments, the mixture is heated from room temperature to 220° C. to 270° C. In some embodiments, an appropriate pressure for step (b) is 1 atm to 6 atm, preferably 1.7 atm to 4 atm. In some embodiments, the reaction time of step (b) is 2 hours to 6 hours. Whether the esterification reaction is complete is determined by observing the amount of water or alcohol produced in step (b). Specifically, the theoretical amount of water or alcohol produced after reacting all the monomers in the mixture can be obtained by theoretical calculations. When the amount of water or alcohol produced in step (b) reaches more than 80% of the theoretical amount of water or alcohol, such as 85%, 90%, or 95%, the esterification reaction is approximately complete.

Next, step (c) is performed to further polymerize the oligomers to form polymers. In some embodiments, step (c) includes heating the oligomers to 250° C. to 300° C., and vacuum pumping for 30 minutes to 60 minutes to make the ambient pressure less than 3 Torr, preferably less than 1 Torr. In some embodiments, the oligomer releases dials in the polymerization reaction so that the viscosity of the polymer gradually increases. In some embodiments, chain extenders such as hexa ethylene diisocyanate (HDI) can optionally add. The amount of chain extender may be, for example, 0 to 2.5 mol % of the total mole number of the residues of formula (ii) and formula (iii). The reaction time of step (c) may be, for example, 1.5 hours to 8 hours. When the viscosity of the polymer reaches a specific value, the polymerization reaction is complete so that the product can be collected. The polymer product is pelletized and tested, and then dried to a moisture content of less than 200 ppm, preferably less than 100 ppm, and more preferably less than 50 ppm, before the injection molding.

The following experimental examples are used to elaborate on the particular embodiments of the present disclosure and to enable those skilled in the art to implement the present disclosure. However, the following experimental examples are not intended to limit the present disclosure.

Embodiments 1 to 12 provide the polyesters including TCDDM. The polyesters that include TCDDM in Embodiments 1 to 12 have the number average molecular weights not less than 15,000 (e.g., in the range from 15,000 to 25,000), and the degrees of dispersion in the range of 2.95 to 5.70. The following describes in detail the reaction dosage and reaction steps of Embodiments 1 to 12.

The reaction steps of preparing polyester in Embodiment 1 included step (a) to step (c). In step (a), the following reaction monomers, 100 mol % terephthalic acid (PTA), and 150 mol % tricyclodecane dimethanol (TCDDM) and ethylene glycol (EG) were added to an autoclave to form a mixture, where the alcohol to add addition ratio was 1.5, and 0.2 mol % glycerol was added. The alcohol to acid addition ratio was the ratio of the total addition of EG and TCDDM to the addition of PTA. Then the reaction monomers were stirred evenly, where the stirring rate was 100 rpm to 500 rpm. 10 ppm titanium(IV) butoxide was added as the catalyst and co-catalyst, and/or 40 ppm TMP was added as the heat stabilizer.

Step (b) was subsequently performed, where the mixture of step (a) was heated from room temperature to 210° C. to 260° C. so that the reaction monomers underwent an esterification reaction to form oligomers. The pressure was 1 atm to 6 atm and the reaction time was 2 hours to 6 hours. When the produced amount of water or alcohol reached 95% of the theoretical amount of water or alcohol, step (c) was performed. In step (c), the oligomers were heated to 260° C. to 300° C., and vacuum pumped for 30 minutes to make the ambient pressure less than 1 Torr. The reaction time was 2 hours to 8 hours. When the viscosity of the polymer reached a value of IV>0.5 dl/g, the polymerization reaction was complete so that the polymerization product could be collected. In the polyester of Embodiment 1, the amount of TCDDM was 75 mol %, the amount of EG was 25 mol %, and the amount of PTA was 100 mol %, The polyester in Embodiment 1 had a degree of dispersion (Mw/Mn) being 3.502, where Mw was 70393, and Mn was 20098.

The reaction monomer species and the reaction steps of Embodiment 2 were substantially similar to those of Embodiment 1. However, in step (a), the additions of the reaction monomers were 100 mol % PTA and 180 mol % TCDDM and EG. The alcohol to acid addition ratio as 1.8. No glycerol was added.

In the polyester of Embodiment 2, the amount of TCDDM was 75 mol %, the amount of EG was 25 mol %, and the amount of PTA was 100 mol %. The polyester in Embodiment 2 had the degree of dispersion (Mw/Mn) being 3.453, where Mw was 73692, and Mn was 21335.

The reaction monomer species and the reaction steps of Embodiment 3 were substantially similar to those of Embodiment 1. However, in step (a), the additions of the reaction monomers were 100 mol % PTA and 250 mol % TCDDM and EG. The alcohol to acid addition ratio was 2.5. No glycerol was added.

In the polyester of Embodiment 3, the amount of TCDDM was 75 mol %, the amount of EG was 25 mol %, and the amount of PTA was 100 mol %. The polyester in Embodiment 3 had the degree of dispersion (Mw/Mn) being 3.304, where Mw was 74680, and Mn was 22605.

The reaction monomer species and the reaction steps of Embodiment 4 were substantially similar to those of Embodiment 1. However, in step (a), the additions of the reaction monomers were 100 mobs PTA and 400 mol % TCDDM and EG. The alcohol to acid addition ratio was 4.0. No glycerol was added.

In the polyester of Embodiment 4, the amount of TCDDM was 75 mol %, the amount of EG was 25 mol %, and the amount of PTA was 100 mol %. The polyester in Embodiment 4 had the degree of dispersion (Mw/Mn) being 3.259, where Mw was 70152, and Mn was 21525.

The reaction monomer species and the reaction steps of Embodiment 5 were substantially similar to those of Embodiment 1. However, in step (a), no glycerol was added, and in step (c), hexamethylene diisocyanate (HDI) as the chain extender was further added, where the addition of HDI was 1.5 mol % based on the total molar number of PTA.

In the polyester of Embodiment 5, the amount of TCDDM was 75 mol %, the amount of EG was 25 mol %, and the amount of PTA was 100 mol %. The polyester in Embodiment 5 had the degree of dispersion (Mw/Mn) being 3.205, where Mw was 64494, and Mn was 20123.

The reaction monomer species and the reaction steps of Embodiment 6 were substantially similar to those of Embodiment 1. However, in step (a), the addition of glycerol was adjusted to 0.8 mol %.

In the polyester of Embodiment 6, the amount of TCDDM was 75 mol %, the amount of EG was 25 mol %, and the amount of PTA was 100 mol %. The polyester in Embodiment 6 had the degree of dispersion (Mw/Mn) being 4.499, where Mw a 73237, and Mn was 16275.

The reaction monomer species and the reaction steps of Embodiment 7 were substantially similar to those of Embodiment 1. However, in step (a), the additions of the reaction monomers were 100 mol % PTA and 190 mol % TCDDM and EG. The alcohol to acid addition ratio was 1.9. Glycerol was replaced with trimethylolpropane (TMP), where the addition of TMP was 0.6 mol % based on the total molar number of PTA.

In the polyester of Embodiment 7, the amount of TCDDM was 75 mol %, the amount of EG was 25 mol %, and the amount of PTA was 100 mol %. The polyester in Embodiment 7 had the degree of dispersion (Mw/Mn) being 4.056, where Mw was 81650, and Mn was 20130.

The reaction monomer species and the reaction steps of Embodiment 8 were substantially similar to those of Embodiment 1. However, in step (a), 1,4-butanediol (BDO), instead of EG, was added. The additions of the reaction monomers were 100 mol % PTA and 230 mol % TCDDM and BDO. The alcohol to acid addition ratio was 2.3. No glycerol was added.

In the polyester of Embodiment 8, the amount of TCDDM was 75 mol %, the amount of BDO was 25 mol %, and the amount of PTA was 100 mol %. The polyester in Embodiment 8 had the degree of dispersion (Mw/Mn) being 3.139, where Mw was 58808, and Mn was 18734.

The reaction monomer species and the reaction steps of Embodiment 9 were substantially similar to those of Embodiment 1. However, in step (a), the additions of the reaction monomers were 100 mol % PTA and 200 mol % TCDDM and EG. The alcohol to acid addition ratio was 2.0. No glycerol was added.

In the polyester of Embodiment 9, the amount of TCDDM was 18.1 mol %, the amount of EG was 71.9 mol %, and the amount of PTA was 100 mol %. The polyester in Embodiment 9 had the degree of dispersion (Mw/Mn) being 3.162, where Mw was 63592, and Mn was 20112.

The reaction monomer species, the reaction dosage of the monomers, and the reaction steps of Embodiment 10 were substantially similar to those of Embodiment 9. In the polyester of Embodiment 10, the amount of TCDDM was 24 mol %, the amount of EG was 76 mol %, and the amount of PTA was 100 mol %. The polyester in Embodiment 10 had the degree of dispersion (Mw/Mn) being 3.709, where Mw was 79323, and Mn was 21385.

The reaction monomer species, the reaction dosage of the monomers, and the reaction steps of Embodiment 11 were substantially similar to those of Embodiment 9. In the polyester of Embodiment 11, the amount of TCDDM was 47.4 mol %, the amount of EG was 52.6 mol %, and the amount of PTA was 100 mol %. The polyester in Embodiment 11 had the degree of dispersion (Mw/Mn) being 3.212, where Mw was 62789, and Mn was 19550.

The reaction monomer species, the reaction dosage of the monomers, and the reaction steps of Embodiment 12 were substantially similar to those of Embodiment 11. In the polyester of Embodiment 12, the amount of TCDDM was 89.9 mol %, the amount of EG was 25 mol %, and the amount of PTA was 100 mol %. The polyester in Embodiment 12 had the degree of dispersion (Mw/Mn) being 3.167, where Mw was 62607, and Mn was 19771.

The above weight average molecular weight (Mw) and number average molecular weight (Mn) were measured based on gel permeation chromatography (GPC). Specifically, gel permeation chromatography used the following instruments: SHIMADZU LC-20AT PUMP, SPD-10A, SCL-10Avp Autosampler, and COLBOX COLUMN OVEN. The total three columns were HP $10^3$A, $10^4$A, and $10^5$A. The standard product was polystyrene from TOSOH Company of Japan and was formulated into two groups. The first group had weight average molecular weights (Mw) of 2000000, 434000, 96400, 18100, 5970, and 1050. The second group had weight average molecular weights (Mw) of 950000, 190000, 37900, 9100, 2630, and 531. In the preparation, 0.03 g of standard product was weighed by group. 10 ml of chloroform ($CHCl_3$) was added for dissolution. $R^2$ value of the calibration curve reached up to 0.99. The standard products performed the parallel testing again with the molecular weights tested equivalent to the standard values. The solvent was hexafluoro-2-propanol/chloroform with a volume ratio 119. The oven temperature was 35° C. and the flow rate was 0.8 ml/min. The sensor used was SHIMADZU SPD 10A with a sample injection volume of 10 μl. The analysis time was 45 minutes. Samples were pretreated by weighing 0.01 g of sample in an LC vial, adding 0.1 ml of hexafluoro-2-propanol, adding 0.1 ml of chloroform, leaving to stand at room temperature, dissolving then adding 1.5 ml of chloroform, shaking well, and preparing for analysis.

It is worth noting that the polymerization products from Embodiments 1 to 12 had the number average molecular weights not less than 15000 (e.g., in the range of 15000 to 26000), while the degrees of dispersion were in the range of 2.95 to 5.70.

The polymerization products in Comparative Embodiments 1 to 5 do not simultaneously meet both criteria, which are number average molecular weight not less than 15000 (e.g., in the range of 15000 to 25000) and degree of dispersion in the range of 2.95 to 5.70. The following describes the reaction dosage and reaction steps of Comparative Embodiments 1 to 5 in detail.

The reaction monomer species and the reaction steps of Comparative Embodiment 1 were substantially similar to Embodiment 1. However, in step (a), the reaction monomers were added in an amount of 100 mol % PTA and 120 mol % TCDDM and EG. The alcohol to acid addition ratio was 1.2. No glycerol was added. In the polyester of Comparative Embodiment 1, the amount of TCDDM was 75 mol %, the amount of EG was 25 mol %, and the amount of PTA was 100 mol %. The polyester in Comparative Embodiment 1 had the degree of dispersion (Mw/Mn) being 2.883, where Mw was 32271, and Mn was 11193.

The reaction monomer species, the reaction dosage of the monomers, and the reaction steps of Comparative Embodiment 2 were substantially similar to Embodiment 1, i.e., the alcohol to acid addition ratio was 1.5. However, no glycerol was added in step (a). In the polyester of Comparative Embodiment 2, the amount of TCDDM was 75 mol %, the amount of EG was 25 mol %, and the amount of PTA was 100 mol %. The polyester in Comparative Embodiment 2 had the degree of dispersion (Mw/Mn) being 5.783, where Mw was 114275, and Mn was 19762.

The reaction monomer species and the reaction steps of Comparative Embodiment 3 were the same as those in Embodiment 1. However, in step (a), methylpropanediol (MPDO) replaced EG. The reaction monomers were added in an amount of 100 mol % PTA and 190 mol % TCDDM and MPDO. The alcohol to acid addition ratio was 1.9. No glycerol was added. In the polyester of Comparative Embodiment 3, the amount of TCDDM was 75 mol %, the amount of MPDO was 25 mol %, and the amount of PTA was 100 mol %. The polyester in Comparative Embodiment 3 had the degree of dispersion (Mw/Mn) being 3.287, where Mw was 48096, and Mn was 14631.

The reaction monomer species, the reaction dosage of the monomer, and the reaction steps of Comparative Embodiment 4 were substantially similar to Embodiment 9, i.e., the alcohol to acid addition ratio was 2.0. In the polyester of Comparative Embodiment 4, the amount of TCDDM was 9.5 mol %, the amount of EG was 25 mol %, and the amount of PTA was 100 mol %. The polyester in Comparative Embodiment 4 had the degree of dispersion (Mw/Mn) being 2.920, where Mw was 65921, and Mn was 22576.

The reaction monomers of Comparative Embodiment 5 did not include EG. In step (a), the reaction monomers were added in an amount of 100 mol % PTA and 200 mol % TCDDM, i.e., the alcohol to acid addition ratio being 2.0. In the polyester of Comparative Embodiment 5, the amount of TCDDM was 100 mol %, the amount of PTA was 100 mol %, and the amount of EG was 0. The polyester in Comparative Embodiment 5 had the degree of dispersion (Mw/Mn) being 3.140, where Mw was 46054, and Mn was 14667.

The polymerization products from Embodiments 1 to 12 and Comparative Embodiments 1 to 5 were subjected to the inherent viscosity (IV) and elongation (measured in unit %) tests. The inherent viscosity was tested according to ASTM D4603. The elongation was tested in accordance with ISO 527. Table 1 and Table 2 show the test results of Embodiments 1 to 12 and Comparative Embodiments 1 to 5, respectively.

TABLE 1

| | Embodiments | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| IV | 0.67 | 0.65 | 0.71 | 0.69 | 0.62 | 0.59 | 0.68 | 0.64 | 0.76 | 0.76 | 0.63 | 0.61 |
| Elongation (%) | 211 | 221 | 246 | 240 | 209 | 143 | 130.8 | 188.0 | 292 | 315 | 213 | 180 |

TABLE 2

| | Comparative Embodiments | | | | |
|---|---|---|---|---|---|
| | 1 | 2 | 3 | 4 | 5 |
| IV | 0.42 | 0.66 | 0.51 | 0.80 | 0.47 |
| Elongation (%) | 2.3 | 119 | 84 | 68 | 11.23 |

As shown in Table 1, ire the case of two criteria, the number average molecular weight not less than 15000 (e.g., in the range of 15000 to 25000) and the degree of dispersion between 2.95 and 5.70, simultaneously satisfying, the polymerization products of Embodiments 1 to 12 had extremely excellent tensile strength. Specifically, the tensile strengths in Embodiments 1 to 12 were larger than 130% and even as high as 315%. In contrast, the largest tensile strength of the polymerization product in Comparative Embodiments 1 to 5 was only 119% (see Table 2). The melting temperature (Tm) of Comparative Embodiment 4 was 227° C., which made Comparative Embodiment 4 have a higher haze, a poor appearance, and being less suitable for subsequent applications.

In summary, the present disclosure provides a polyester including TCDDM. The polyester that includes TCDDM has a number average molecular weight not less than 15000 (e.g., located in the range of 15000 to 25000) and has a degree of dispersion ranged from 2.95 to 5.70. The polyesters that include TCDDM in the present disclosure have the extremely high tensile strength to meet the industry requirement for manufacturing a wide range of products.

The above content summarizes the characteristics of several embodiments or examples so that those skilled in the art may better understand the embodiments of the present disclosure. Those killed in the art should understand that they may use the present disclosure easily as a basis for designing or modifying other processes and structures to perform the same purpose and/or achieve the same advantages as the embodiments described herein. Also, those skilled in art should recognize that these equivalent structures do not deviate from the spirit and scope of the present disclosure. They may perform various changes, substitutions, and replacements without departing from the spirit and scope of the present disclosure.

What is claimed is:

1. A polyester, comprising residues of formula (i), (ii), and formula (iii):

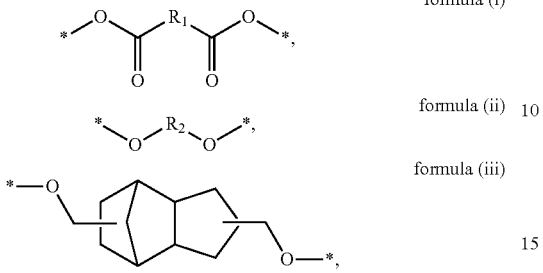

formula (i)

formula (ii)

formula (iii)

wherein $R_1$ is an arylene group;
$R_2$ is a $C_2$-$C_6$ straight-chain hydrocarbylene group; and
* represents a linking bond,
wherein the polyester has a number average molecular weight not less than 15,000 and has a degree of dispersion ranged from 2.95 to 5.70.

2. The polyester of claim 1, wherein $R_1$ is

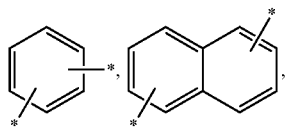

or a combination thereof.

3. The polyester of claim 1, wherein $R_2$ is a $C_2$-$C_4$ straight-chain hydrocarbylene group.

4. The polyester of claim 3, wherein $R_2$ is a $C_2$ straight-chain hydrocarbylene group.

5. The polyester of claim 1, wherein the number average molecular weight is 15,000 to 25,000.

6. The polyester of claim 5, wherein the number average molecular weight is 16,000 to 23,000.

7. The polyester of claim 1, wherein the degree of dispersion is 3.00 to 4.50.

8. The polyester of claim 7, wherein the degree of dispersion is 3.10 to 4.50.

9. The polyester of claim 8, wherein the degree of dispersion is 3.13 to 4.50.

10. The polyester of claim 1, wherein the residue of formula (iii) is 10 mol % to 90 mol % of a sum of the residue of formula (ii) and the residue of formula (iii).

11. The polyester of claim 10, wherein the residue of formula (iii) is 20 mol % to 80 mol % of a sum of the residue of formula (ii) and the residue of formula (iii).

12. A molded article, comprising the polyester of claim 1.

13. The molded article of claim 12, wherein $R_1$ is

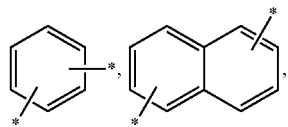

or a combination thereof.

14. The molded article of claim 12, wherein $R_2$ is a $C_2$-$C_4$ straight-chain hydrocarbylene group.

15. The molded article of claim 14, wherein $R_2$ is a $C_2$ straight-chain hydrocarbylene group.

16. The molded article of claim 12, wherein the number average molecular weight is 15,000 to 25,000.

17. The molded article of claim 16, wherein the number average molecular weight is 16,000 to 23,000.

18. The molded article of claim 12, wherein the degree of dispersion is 3.00 to 4.50.

19. The molded article of claim 12, wherein the residue of formula (iii) is 10 mol % to 90 mol % of a sum of the residue of formula (ii) and the residue of formula (iii).

20. The molded article of claim 19, wherein the residue of formula (iii) is 20 mol % to 80 mol % of a sum of the residue of formula (ii) and the residue of formula (iii).

* * * * *